F. HENZELMANN.
ANTIFRICTION BEARING.
APPLICATION FILED OCT. 23, 1908.
929,427.
Patented July 27, 1909.
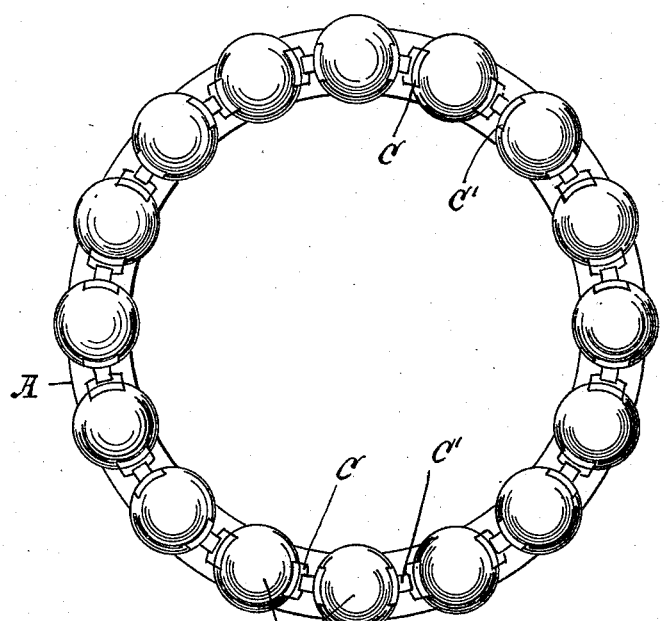
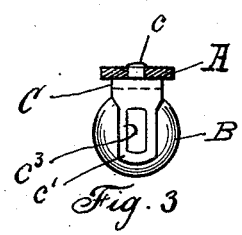
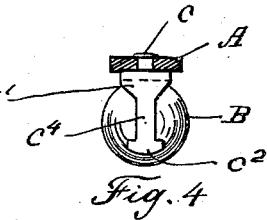
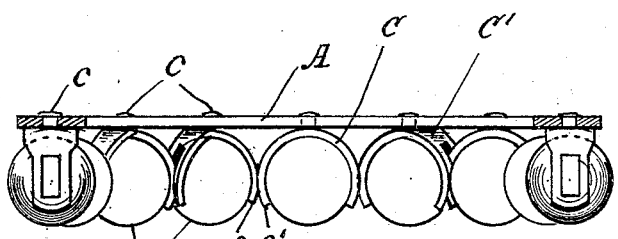
WITNESSES
Joe McCarthy
Gustave Miller
INVENTOR
Fritz Henzelmann
By Robt. Klotz
Atty.

UNITED STATES PATENT OFFICE.

FRITZ HENZELMANN, OF CHICAGO, ILLINOIS.

ANTIFRICTION-BEARING.

No. 929,427. Specification of Letters Patent. Patented July 27, 1909.

Application filed October 23, 1908. Serial No. 459,162.

*To all whom it may concern:*

Be it known that I, FRITZ HENZELMANN, a subject of the Emperor of Germany, residing at Chicago, in the county of Cook and State of Illinois, have invented a new and useful Improvement in Antifriction-Bearings, of which the following is a complete specification.

This invention relates to improvements in anti-friction bearings and more particularly to a ball bearing in which the balls are individually supported in a carrier so that any individual ball or its supporting member may be removed without interfering with the others.

For many purposes where ball bearings are employed it is desirable to retain the balls in a holder or carrier which is capable of being inserted between or removed from the bearing surfaces as a whole, and which will permit the balls to freely move with a minimum amount of friction in the carrier.

The object of the invention is to provide an antifriction bearing of the ball type in which the balls are individually supported by means permitting them to turn freely under the influence of the bearing surfaces, so as to reduce the internal friction of the bearing to a minimum, and also to permit of their being individually removed in case it is desired to do so.

It is a further object of the invention to provide a ball bearing in which the individual supporting members for the balls are so connected that the forward thrust on the balls is transmitted from one member to the other, thus minimizing the strain on each member.

Another object of the invention is to provide a very cheap and simple bearing adapted to be easily inserted or removed from between two bearing surfaces and so constructed that the greatest possible freedom of movement of the balls is afforded.

The invention consists of the matters hereinafter described in the specification and more fully pointed out and defined in the appended claims.

In the drawings: Figure 1 is a bottom plan view of a device embodying my invention. Fig. 2 is a transverse section thereof in upright position. Fig. 3 is a transverse section of the device showing one form of the supporting members in end elevation. Fig. 4 is a view similar to Fig. 3 but showing the other form of the supporting members in end elevation.

As shown in said drawings: A indicates a carrying plate of any preferred material and construction, but which, as herein shown, is annular and is adapted to support the bearing balls B between the bearing surfaces. Rigidly engaged on one side of said plate is a plurality of supporting members or yokes C—C' for said balls, and each of which as shown is provided with an integral stud or rivet $c$ which extends through said plate and is riveted or otherwise secured therein. As shown said rivets are arranged centrally between the outer and inner circumferences or edges of the plate and are equal distances apart, and the yokes are arranged longitudinally of the plate with the arms $c'$—$c^2$ interlocking. The arms of said yokes may be interlocked in any preferred manner but, as shown, the arms $c'$ of the yokes C are provided with longitudinal slots $c^3$, and the arms $c^2$ of the yokes C' are each provided with a narrow central portion $c^4$ adapted to seat in said slots and thereby hold said yokes in proper relation to each other. The inner faces of said arms $c'$—$c^2$ are concaved both longitudinally and transversely to conform to the surface of the balls. As shown the yokes C—C' are arranged alternately though obviously, if desired, each yoke may be provided with one slotted arm and one arm having a narrow portion or lug thereon adapted to be inserted in the slotted arm of the adjacent yoke.

In assembling the device each ball is placed in its yoke and the arms of the yoke, which are of sufficient length to extend more than half way around the ball, are bent about the ball so as to hold it therebetween. The yokes are then engaged to the carrying plate, with their arms interlocking as before described, thereby leaving the sides of the balls adjacent each edge of the plate free to contact with the surfaces between which the bearing is inserted.

Obviously an anti-friction bearing constructed in accordance with my invention is adapted to greatly reduce the internal friction of the bearing, and to provide a very simple construction from which any individual ball or its yoke may be removed without interfering with the others, and obviously also many details of form and construction may be varied without departing from the principles of my invention.

I claim as my invention:

1. In a device of the class described the combination with a carrying plate of a plurality of interlocking supporting members thereon, and a ball engaged in each supporting member.

2. In a device of the class described the combination with a plate of a plurality of interlocking yokes supported thereon in longitudinal alinement, and a ball engaged in each yoke.

3. In a device of the class described the combination with a plate of a plurality of yokes engaged on one side thereof and having interlocking arms, and a ball supported in each yoke.

4. In a device of the class described the combination with an annular plate of a plurality of yokes engaged on one side thereof, and having arms arranged equidistant from the axis of the plate, interlocking means on said arms, and a ball engaged between the arms of each yoke.

5. In a device of the class described the combination with a plate of a plurality of interlocking curved arms thereon, and a plurality of balls engaged between said arms.

In testimony whereof I have hereunto subscribed my name in the presence of two witnesses.

FRITZ HENZELMANN.

Witnesses:
 ROBT. KLOTZ,
 JOE MILLER.